US011434417B2

(12) United States Patent
Lafitte et al.

(10) Patent No.: US 11,434,417 B2
(45) Date of Patent: Sep. 6, 2022

(54) FLUIDS CONTAINING CELLULOSE FIBERS AND CELLULOSE NANOPARTICLES FOR OILFIELD APPLICATIONS

(71) Applicant: Schlumberger Technology Corporation, Sugar Land, TX (US)

(72) Inventors: Valerie Gisele Helene Lafitte, Sugar Land, TX (US); Mohan Kanaka Raju Panga, Sugar Land, TX (US); Richard Berry, Malvern, OH (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 16/885,558

(22) Filed: May 28, 2020

(65) Prior Publication Data

US 2020/0291290 A1    Sep. 17, 2020

Related U.S. Application Data

(62) Division of application No. 15/359,194, filed on Nov. 22, 2016, now Pat. No. 10,689,564.

(60) Provisional application No. 62/258,881, filed on Nov. 23, 2015.

(51) Int. Cl.
| | |
|---|---|
| C09K 8/60 | (2006.01) |
| C09K 8/90 | (2006.01) |
| C09K 8/487 | (2006.01) |
| C09K 8/62 | (2006.01) |
| C09K 8/575 | (2006.01) |
| C09K 8/035 | (2006.01) |
| C09K 8/514 | (2006.01) |

(52) U.S. Cl.
CPC .............. *C09K 8/602* (2013.01); *C09K 8/035* (2013.01); *C09K 8/487* (2013.01); *C09K 8/514* (2013.01); *C09K 8/5758* (2013.01); *C09K 8/62* (2013.01); *C09K 8/90* (2013.01); *C09K 2208/08* (2013.01); *C09K 2208/30* (2013.01)

(58) Field of Classification Search
None
See application file for complete search history.

(56) References Cited

U.S. PATENT DOCUMENTS

| | | |
|---|---|---|
| 2,863,832 A | 12/1958 | Perrine |
| 2,910,436 A | 10/1959 | Irving |
| 3,215,199 A | 11/1965 | Dilgren |
| 3,251,415 A | 5/1966 | Bombardieri |
| 3,297,090 A | 1/1967 | Dilgren |
| 3,307,630 A | 3/1967 | Dilgren |
| 3,441,085 A | 4/1969 | Gidley |
| 3,451,818 A | 6/1969 | Wareham |
| 4,341,807 A | 7/1982 | Turbak et al. |
| 4,374,702 A | 2/1983 | Turbak et al. |
| 4,378,381 A | 3/1983 | Turbak et al. |
| 4,452,721 A | 6/1984 | Turbak et al. |
| 4,452,722 A | 6/1984 | Turbak et al. |
| 4,464,287 A | 8/1984 | Turbak et al. |
| 4,483,743 A | 11/1984 | Turbak et al. |
| 4,487,634 A | 12/1984 | Turbak et al. |
| 4,500,546 A | 2/1985 | Turbak et al. |
| 4,537,918 A | 8/1985 | Parcevaux et al. |
| 4,863,565 A | 9/1989 | Johnson et al. |
| 5,518,996 A | 5/1996 | Maroy et al. |
| 5,551,516 A | 9/1996 | Norman et al. |
| 6,235,809 B1 | 5/2001 | DiLullo Arias et al. |
| 6,435,277 B1 | 8/2002 | Qu et al. |
| 6,703,352 B2 | 3/2004 | Dahayanake et al. |
| 6,732,800 B2 | 5/2004 | Acock et al. |
| 6,752,206 B2 | 6/2004 | Watson et al. |
| 7,337,839 B2 | 3/2008 | Ayoub et al. |
| 7,381,294 B2 | 6/2008 | Suzuki et al. |
| 7,482,311 B2 | 1/2009 | Willberg et al. |
| 7,806,182 B2 | 10/2010 | Waters et al. |
| 7,858,561 B2 | 12/2010 | Abad et al. |
| 7,956,016 B2 | 6/2011 | Panga et al. |
| 7,971,644 B2 | 7/2011 | Ladva et al. |
| 8,020,618 B2 | 9/2011 | Veronique et al. |
| 8,322,419 B2 | 12/2012 | Parlar et al. |
| 8,381,813 B2 | 2/2013 | Diaz et al. |
| 8,490,697 B2 | 7/2013 | Garcia et al. |
| 2005/0028978 A1 | 2/2005 | Parlar et al. |
| 2008/0128129 A1 | 6/2008 | Yeh et al. |
| 2009/0065207 A1 | 3/2009 | Shenoy et al. |
| 2010/0018709 A1 | 1/2010 | Parlar et al. |
| 2010/0096130 A1 | 4/2010 | Parlar et al. |
| 2010/0139919 A1 | 6/2010 | Yeh et al. |
| 2010/0314109 A1 | 12/2010 | Garcia et al. |
| 2011/0036522 A1 | 2/2011 | Ankerfors et al. |
| 2012/0048547 A1 | 3/2012 | Hughes et al. |
| 2012/0153214 A1 | 6/2012 | Boluk et al. |
| 2013/0196883 A1 | 8/2013 | Rincon-Torres et al. |
| 2013/0274149 A1 | 10/2013 | Lafitte et al. |
| 2014/0014337 A1 | 1/2014 | Stringfield et al. |
| 2015/0198016 A1 | 7/2015 | Langlais |
| 2015/0308238 A1 | 10/2015 | Langlais |

(Continued)

FOREIGN PATENT DOCUMENTS

| | | |
|---|---|---|
| WO | 2007091942 A1 | 8/2007 |
| WO | 2011051882 A1 | 5/2011 |

(Continued)

OTHER PUBLICATIONS

Oilfield Applications, Encyclopedia of Polymer Science and Engineering, vol. 10, pp. 328-366 John Wiley & Sons, Inc. New York, New York, 1987.

(Continued)

*Primary Examiner* — John J Figueroa
(74) *Attorney, Agent, or Firm* — Matthew Goode

(57) ABSTRACT

A fluid for treating a subterranean formation includes a solvent, a rheology modifier, and a composition that includes a mixture of cellulose fibers and cellulose nanoparticles. The cellulose nanoparticles have a positive zeta potential in a range of about +100 mV to about +10 mV, and a length in a range of from about 50 nm to about 500 nm, and the cellulose fibers have a length from about 50 microns to about 500 microns.

14 Claims, 1 Drawing Sheet

(56) References Cited

U.S. PATENT DOCUMENTS

| | | | | |
|---|---|---|---|---|
| 2015/0368541 A1* | 12/2015 | Monclin | ............. | C09K 8/64 |
| | | | | 507/108 |
| 2016/0032168 A1* | 2/2016 | Al-Bagoury | ........... | D21H 11/18 |
| | | | | 507/113 |
| 2016/0075601 A1* | 3/2016 | Youngblood | ........... | C04B 18/24 |
| | | | | 106/805 |
| 2016/0168443 A1* | 6/2016 | Lafitte | ................ | C09K 8/68 |
| | | | | 507/112 |
| 2017/0145285 A1 | 5/2017 | Lafitte et al. | | |
| 2017/0226398 A1 | 8/2017 | Shimaoka et al. | | |
| 2017/0226407 A1 | 8/2017 | Homma et al. | | |

FOREIGN PATENT DOCUMENTS

| | | |
|---|---|---|
| WO | 2011089323 A1 | 7/2011 |
| WO | 2012072874 A1 | 6/2012 |
| WO | 2012152997 A1 | 11/2012 |
| WO | 2014049208 A1 | 4/2014 |
| WO | 2014183082 A1 | 11/2014 |

OTHER PUBLICATIONS

Stimulation Engineering Handbook, John W. Ely, Pennwell Publishing Co., Tulsa, Okla. (1994). pp. 197-202.
Chinga-Carrasco (2011) Cellulose fibres, nanofibrils and microfibrils: The morphological sequence of MFC components from a plant physiology and fibre technology point of view, Nanoscale Research Letters 2011, 6:417 (7 pages).

\* cited by examiner

FLUIDS CONTAINING CELLULOSE FIBERS AND CELLULOSE NANOPARTICLES FOR OILFIELD APPLICATIONS

CROSS-REFERENCE TO RELATED APPLICATION

This application is a division of U.S. Patent Application Publication No. 2017/0145285, filed on Nov. 22, 2016, which claims the benefit of and priority to U.S. Provisional Patent Application No. 62/258,881, filed Nov. 23, 2015, the disclosure of which is hereby incorporated by reference.

BACKGROUND

Hydrocarbons (oil, natural gas, etc.) may be obtained from a subterranean geologic formation (a "reservoir") by drilling a well that penetrates the hydrocarbon-bearing formation. Well treatment methods often are used to increase hydrocarbon production by using a chemical composition or fluid, such as a treatment fluid.

Cellulose fibers and their derivatives constitute one of the most abundant renewable polymer resources available on earth and can be used in treatment methods for a variety of reasons, such as viscosifying various fluids used in stimulation, drilling and cementing fluids. Cellulose fibers can be obtained from a cellulosic source, such as wood pulp, by known processes, some of which may break down and wash away the lignin (leaving behind the cellulose fibers, which may have an abundance of hydroxyl groups). Further processing (mechanical or chemical) breaks the cellulose fibers down into nanocellulose (such as NanoCrystalline Cellulose (NCC) particles) and/or nanofibrils, which depending on the processing conditions may also have an abundance of hydroxyl groups.

Nanocelluloses, such as NCC particles, have the capability of forming inter and intra hydrogen bonding amongst the particles in water based treatment fluids. This network formation helps suspend particles within the treatment fluid. For treatment fluids containing nanocelluloses, suspension of the components of the fluid is able to take place above a certain threshold nanocellulose concentration (that is, a threshold nanocellulose concentration), which is dependent on a variety of factors, such as, for example, the dimensions of the particles, and ionic strength of the fluid. Below this threshold concentration, nanocelluloses, such as NCC particles, may lose their suspension capabilities, and thus to aid with suspension (for treatment fluids containing nanocellulose contents below the threshold concentration), an additional component can be added to the treatment fluid.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In some embodiments, the present disclosure relates to method for treating a subterranean formation, the method including combining a rheology modifier, a mixture of cellulose nanoparticles and cellulose fibers, and a solvent to form a treatment fluid, where the cellulose nanoparticles have a negative zeta potential or a positive zeta potential, and a length in the range of from about 50 nm to about 500 nm, and the cellulose fibers have a length of from about 10 microns to about 500 microns; and introducing the treatment fluid into a subterranean formation.

In some embodiments, the present disclosure relates a fluid for treating a subterranean formation, the fluid including a solvent, a rheology modifier, and a composition including a mixture of cellulose fibers and cellulose nanoparticles, where the cellulose nanoparticles have a negative zeta potential, and a length in the range of from about 50 nm to about 500 nm, and the cellulose fibers have a length of from about 40 microns to about 500 microns.

In some embodiments, the present disclosure relates a method of controlling lost circulation in a subterranean formation or method for treating a subterranean formation. The method may include contacting a subterranean formation with a treatment fluid including a solvent, a cellulosic fiber, and a cellulose nanoparticle.

In some embodiments, the present disclosure relates to a lost-circulation material including a cellulosic fiber, and a cellulose nanoparticle.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
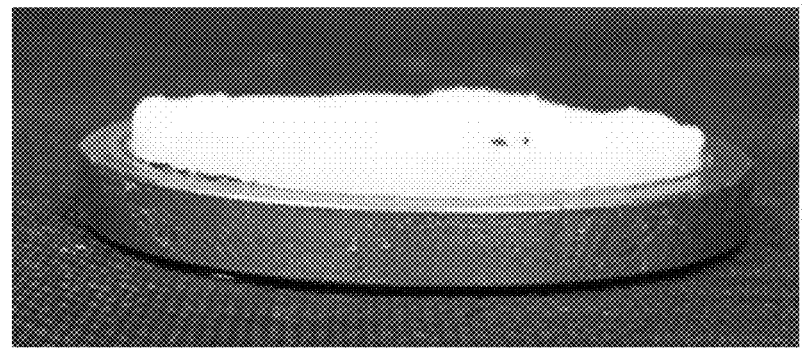
FIG. 1 shows an example of a white filter cake as a result of a test.

In the following description, numerous details are set forth to provide an understanding of the present disclosure. However, it may be understood by those skilled in the art that the methods of the present disclosure may be practiced without these details and that numerous variations or modifications from the described embodiments may be possible.

At the outset, it should be noted that in the development of any such actual embodiment, numerous implementation-specific decisions may be made to achieve the developer's specific goals, such as compliance with system related and business related constraints, which will vary from one implementation to another. Moreover, it will be appreciated that such a development effort might be complex and time consuming but would nevertheless be a routine undertaking for those of ordinary skill in the art having the benefit of this disclosure. In addition, the composition used/disclosed herein can also comprise some components other than those cited. In the summary and this detailed description, each numerical value should be read once as modified by the term "about" (unless already expressly so modified), and then read again as not so modified unless otherwise indicated in context. The term about should be understood as any amount or range within 10% of the recited amount or range (for example, a range from about 1 to about 10 encompasses a range from 0.9 to 11). Also, in the summary and this detailed description, it should be understood that a range listed or described as being useful, suitable, or the like, is intended to include support for any conceivable sub-range within the range at least because every point within the range, including the end points, is to be considered as having been stated.

For example, "a range of from 1 to 10" is to be read as indicating each possible number along the continuum between about 1 and about 10. Furthermore, one or more of the data points in the present examples may be combined together, or may be combined with one of the data points in the specification to create a range, and thus include each possible value or number within this range. Thus, (1) even if numerous specific data points within the range are explicitly identified, (2) even if reference is made to a few specific data points within the range, or (3) even when no data points within the range are explicitly identified, it is to be understood (i) that the inventors appreciate and understand that any conceivable data point within the range is to be considered to have been specified, and (ii) that the inventors possessed knowledge of the entire range, each conceivable sub-range within the range, and each conceivable point within the range. Furthermore, the subject matter of this application illustratively disclosed herein suitably may be practiced in the absence of any element(s) that are not specifically disclosed herein.

The methods of the present disclosure relate to introducing treatment fluids comprising a mixture of cellulose fibers and cellulose nanoparticles (such as nanocrystalline cellulose "NCC") into a subterranean formation for an intended downhole operation. Unless otherwise indicated, the term "cellulose fiber(s)" is used interchangeably with the term "cellulosic fiber(s)", and the term "NCC" is used interchangeably with the term "NCC particle".

In some embodiments, the cellulose fibers and cellulose nanoparticles (such as NCC) are present in the treatment fluids in amounts effective to create a type of synergy between the two components that enhances the suspension capability of the treatment fluid such that suspension of, for example, particles (such as proppant) in the treatment fluids is able to take place at cellulose nanoparticle contents that would otherwise afford poor suspension capabilities. For example, in some embodiments, cellulose fibers and NCC particles may be present in the treatment fluids in amounts effective to create a type of synergy that enhances the suspension of, for example, particles (such as proppant) in the treatment fluids to an extent a suspension can be achieved with a substantially lower NCC particle content (in weight percent) relative to a fluid in which the cellulose fibers were absent but the other components were the same (in other words, a treatment fluid where the NCC particles and the other components in the treatment fluid would exhibit a poor suspension capability (i.e., the majority of the components would settle to the bottom of the fluid).

In some embodiments, the cellulose fibers and cellulose nanoparticles (such as NCC) are present in the treatment fluids in amounts effective to suspend particles (for example, proppant materials) in pores and/or fractures of subterranean formations.

In some embodiments, the amounts of the cellulose fibers and the cellulose nanoparticles (such as NCC) in the treatment fluids effective to prevent and/or reduce the loss of fluid circulation into the subterranean formation.

The total amount (by weight percent (wt %) relative to the total weight of the treatment fluid, unless otherwise indicated) of the cellulose fibers and cellulose nanoparticles and relative amounts of each (that is, the weight ratio of the cellulose fibers to the cellulose nanoparticles) to be included in the treatment fluids to achieve the desired effect may depend on the desired application and/or downhole operation, as well as on a number of other factors known to those skilled in the art, including, for example, the downhole equipment, and formation characteristics and conditions.

For example, in some embodiments, the fluids, treatment fluids, or compositions of the present disclosure may contain a mixture of cellulose fibers and cellulose nanoparticles in any effective amount (that is, the total amount including the weight of both the cellulose fibers and cellulose nanoparticles) to accomplish the intended downhole operation, such as in an amount of from about 0.001 wt % to about 20 wt %, such as an amount of from about 0.01 wt % to about 10 wt %, or an amount of from about 0.1 wt % to about 5 wt %, or an amount of from about 0.5 wt % to about 2 wt % based on the total weight of the fluid, treatment fluid, or composition. The amount of the cellulose fibers (alone, not counting the cellulose nanoparticles) in the fluids, treatment fluids, or compositions of the present disclosure may be an amount of from about 0.001 wt % to about 10 wt %, such as an amount of from about 0.01 wt % to about 10 wt %, or an amount of from about 0.1 wt % to about 5 wt %, or an amount of from about 0.5 wt % to about 2 wt % based on the total weight of the fluid, treatment fluid, or composition. In such embodiments, the amount of the cellulose nanoparticles (alone, not counting the cellulose fibers) in the fluids, treatment fluids, or compositions of the present disclosure may be an amount of from about 0.001 wt % to about 10 wt %, such as an amount of from about 0.01 wt % to about 10 wt %, or an amount of from about 0.1 wt % to about 5 wt %, or an amount of from about 0.5 wt % to about 2 wt % based on the total weight of the fluid, treatment fluid, or composition.

In embodiments, the mixture of cellulose fibers and cellulose nanoparticles may include the cellulose fibers in an amount in the range of from about 0.1% to about 99.9% by weight based on the total weight of the mixture of the cellulose fibers and cellulose nanoparticles, or about 1% to about 99% by weight based on the total weight of the mixture of the cellulose fibers and cellulose nanoparticles, or about 5% to about 95% by weight based on the total weight of the mixture of the cellulose fibers and cellulose nanoparticles, or about 15% to about 80% by weight based on the total weight of the mixture of the cellulose fibers and cellulose nanoparticles, or about 25% to about 50% by weight based on the total weight of the mixture of the cellulose fibers and cellulose nanoparticles.

In embodiments, the mixture of cellulose fibers and cellulose nanoparticles may include the cellulose nanoparticles in an amount in the range of from about 0.1% to about 99.9% by weight based on the total weight of the mixture of the cellulose fibers and cellulose nanoparticles, or about 1% to about 99% by weight based on the total weight of the mixture of the cellulose fibers and cellulose nanoparticles, or about 5% to about 95% by weight based on the total weight of the mixture of the cellulose fibers and cellulose nanoparticles, or about 15% to about 80% by weight based on the total weight of the mixture of the cellulose fibers and cellulose nanoparticles, or about 50% to about 75% by weight based on the total weight of the mixture of the cellulose fibers and cellulose nanoparticles.

The treatment fluids comprising the cellulose fibers and cellulose nanoparticles of the present disclosure may be introduced during methods that may be applied at any time in the life cycle of a reservoir, field or oilfield; for example, the methods and treatment fluids of the present disclosure may be employed in any desired downhole application (such as, for example, stimulation, hydraulic fracturing, and cementing) at any time in the life cycle of a reservoir, field or oilfield. For example, the mixture of cellulose fibers and cellulose nanoparticles (such as NCC) may be included in a variety of fluids used in subterranean treatment methods for any desired downhole operation, such as, for example, to provide lost-circulation control and/or provide particle (such as proppant) suspension.

The term "treatment fluid," refers to any fluid used in a subterranean operation in conjunction with a desired function and/or for a desired purpose. The term "treatment," or "treating," does not imply any particular action by the fluid. For example, a treatment fluid (such as a treatment fluid comprising a cellulose fiber and a cellulose nanoparticle, such as nanocrystalline cellulose (NCC)) introduced into a subterranean formation subsequent to a leading-edge fluid may be a hydraulic fracturing fluid, an acidizing fluid (acid fracturing, acid diverting fluid), a stimulation fluid, a sand control fluid, a completion fluid, a wellbore consolidation fluid, a remediation treatment fluid, a cementing fluid, a drilling fluid, a spacer fluid, a frac-packing fluid, or gravel packing fluid. The methods of the present disclosure in which a treatment fluid comprising a mixture of a cellulose fiber and a cellulose nanoparticle (such as a NCC particle) may be used in full-scale operations, pills, or any combination thereof. As used herein, a "pill" is a type of relatively small volume specially prepared treatment fluid, such as a treatment fluid comprising a cellulose nanoparticle where the fluid exhibits a viscosity/yield stress increase resulting from the addition of the cellulose fiber and cellulose nanoparticle, placed or circulated in the wellbore.

The term "fracturing" refers to the process and methods of breaking down a geological formation, such as the rock formation around a wellbore, and creating a fracture by pumping fluid at very high pressures (pressure above the determined closure pressure of the formation), in order to increase production rates from or injection rates into a hydrocarbon reservoir. The fracturing methods of the present disclosure may include a treatment fluid comprising a cellulose fiber and a cellulose nanoparticle, such as a NCC particle, but otherwise use conventional techniques known in the art.

In embodiments, the treatment fluids of the present disclosure may be introduced into a wellbore. A "wellbore" may be any type of well, including, for example, a producing well, a non-producing well, an injection well, a fluid disposal well, an experimental well, an exploratory well, and the like. Wellbores may be vertical, horizontal, deviated some angle between vertical and horizontal, and combinations thereof, for example a vertical well with a non-vertical component.

The term "field" includes land-based (surface and sub-surface) and sub-seabed applications. The term "oilfield," as used herein, includes hydrocarbon oil and gas reservoirs, and formations or portions of formations where hydrocarbon oil and gas are expected but may additionally contain other materials such as water, brine, or some other composition.

The term "treating temperature," refers to the temperature of the treatment fluid that is observed while the treatment fluid is performing its desired function and/or desired purpose.

The term "cellulose nanoparticle" refers, for example, to one or more cellulose nanoparticles, such as a NCC particle, that have an aggregation or interaction tendency either with each other and/or with the cellulose fibers and/or one or more of the additives in the fluid/system. Suitable cellulose nanoparticles may include those described in U.S. Application Publication No. 2013/0274149, the disclosure of which is incorporated by reference herein in its entirety.

In some embodiments, when an effective amount of the cellulose fibers and the cellulose nanoparticles are placed in treatment fluids, such as fracturing fluids, the cellulose fibers and the cellulose nanoparticles will start forming aggregated structures and/or networks, and may increase the viscosity and yield stress of the fluids and systems, as desired. Such aggregation may be driven by various factors and forces, such as, for example, hydrogen bonds, concentration effects, electrostatic forces and van der Waals forces. For example, in some embodiments, the surfaces of neighboring cellulose fibers and/or cellulose nanoparticles may be attracted and/or bound together by hydrogen bonds in aqueous media due to the complementary functional groups on the surface of the cellulose fibers and/or cellulose nanoparticles. Such complementary functional groups may be introduced by surface-functionalizing the surface (or portions of the surface) of the cellulose fibers and/or cellulose nanoparticles.

The surface of the cellulose nanoparticles (and/or the cellulose fibers) may be modified (for example, surface-functionalized) in a manner that is effective to ensure an at least temporary particle suspension capability and/or the onset of the formation of a gel network (for example, a colloidal suspension with the cellulose fibers), which may increase the viscosity of the treatment fluid to a level that is desired for completing the intended downhole operation.

The term "surface-functionalizing" refers, for example, to the process of attaching (via a covalent or ionic bond) a functional group or chemical moiety onto a surface of a cellulose material, such as cellulose fiber and/or cellulose nanoparticle (a NCC particle). Such functionalizing may be by esterification, etherification, acetylation, silylation, oxidation, or functionalization with various other chemical moieties, such as a hydrophobic group, hydroxyls, sulfate esters, carboxylates, phosphates, halides, ethers, aldehydes, ketones, esters, amines, amides and/or various chemicals containing such groups.

The phrase "surface of the cellulose nanoparticle" or "surface of the cellulose fiber" refers, for example, to the outer circumferential areas of a cellulose material (that is either the nanoparticle or fiber, respectively), such as, for example, outer circumferential areas of a cellulose nanoparticle, such as a NCC particle, that contains moieties that are suitable to participate in chemical reactions.

The term "moiety" and/or "moieties" refer, for example, to a particular functional group or part of a molecule, such as, for example, the closely-packed hydroxyl moieties on the surface of a cellulose material, such as, for example, a cellulose nanoparticle (such as NCC).

The term "surface modifier" refers, for example, to a substance, such as a chemical moiety, that attaches or is attached onto a surface of a cellulose material, such as, for example, a cellulose nanoparticle (such as NCC). Such attachment may be by esterification, etherification, acetylation, silylation, oxidation, grafting polymers on the surface, functionalization with various chemical moieties (such as with a hydrophobic group), and noncovalent surface modification, such as adsorbing surfactants, which may interact via a hydroxyl group, sulfate ester group, carboxylate groups, phosphates, halides, ethers, aldehydes, ketones, esters, amines and/or amides.

Cellulose

In embodiments, any suitable cellulose fibers and cellulose nanoparticles (such as nanocrystalline cellulose (NCC)) may be comprised in the treatment fluids of the present disclosure. For example, such cellulose materials may include those having a surface that may be modified (and/or temporarily modified) in a manner (such as, for example, by conferring a negative zeta potential to the cellulose materials), that assists in the suspension of particles (such as proppant(s)) for a predetermined duration in a treatment fluid, such as via the formation of a gel network. Alternatively, the cellulose materials may be surface modified to have positive zeta potential.

The cellulosic fiber may be derived from any suitable cellulose source, such as from a variety of plant products, including, for example, wood pulp, fiber from trees, plants, sugar beets, sugar cane, citrus pulp, potatoes, grains, peanut hulls, corn cobs, tobacco stems, apple pumice, natural grasses, cotton, and peat. In some embodiments, the cellulosic fibers may be obtained by extraction from one or more different types of wood pulp.

In some embodiments, mechanically derived cellulosic fiber may not be chemically treated and/or chemically modified before being introduced into the treatment fluids of the present disclosure.

In embodiments, the cellulosic fibers included in the treatment fluids of the present disclosure may have any suitable length for completing the intended downhole operation, such as, for example, a length in a range of from about 20 μm to about 1000 μm, such as a length in a range of from about 50 μm to about 500 μm, or a length in a range of from about 100 μm to about 250 μm. In embodiments, the average length of the cellulosic fibers included in the treatment fluids of the present disclosure may be in a range of from about 40 μm to about 300 μm, such as an average length in a range of from about 75 μm to about 200 μm, or an average length of from about 100 μm to about 150 μm. The lengths of the fibers may vary depending on whether the fibers are measured in a dry or wet state. It should be understood that a fiber may elongate slightly when the fiber is wet. Unless specified otherwise, the disclosed fiber lengths are not specific to a wet or dry fiber and either wet or dry fibers, or both, may fall within the specified range.

In embodiments, the diameter of the cellulosic fibers included in the treatment fluids may be any suitable diameter for completing the intended downhole operation, such as a diameter in a range of from about 2 μm to about 100 μm, such as a diameter in a range of from about 10 μm to about 80 μm, or from about 15 to about 60 μm. In embodiments, the average diameter of the cellulosic fibers included in the treatment fluids may be a diameter in a range of from about 5 μm to about 60 μm, such as an average diameter in a range of from about 10 μm to about 50 μm, or an average diameter in a range of from about 15 to about 40 μm. In embodiments, the cellulosic fibers may have any suitable aspect ratio for completing the intended downhole operation, such as an aspect ratio (length:diameter) in a range of from about 1 to about 100, such as from about 1 to about 50, or from about 1 to about 20.

In embodiments, the cellulose nanoparticles may have a length in a range of from about 50 nm to about 500 nm, such as in a range of from about 70 to about 300 nm, or in a range of from about 80 to about 100 nm. In such embodiments, the NCC particles may have a diameter in a range of from about 2 to about 50 nm, such as in a range of from about 4 to about 20 nm, or in a range of from about 5 to about 10 nm. In embodiments, the NCC particles may have an aspect ratio (length:diameter) of from about 5 to about 100, such as from about 25 to about 100, or from about 50 to about 75.

In some embodiments, the cellulose nanoparticles may have any desired composition/functionalities, which may vary depending on the fabrication method and/or the source of particles. In embodiments, the cellulose nanoparticles may be selected to ensure the formation and/or the onset of the formation of a gel network in the presence of a predetermined amount of cellulose fiber such that the fluid exhibits an increase in viscosity that is sufficient to suspend at least 80%, such as at least 90%, or at least 99% of the particulate materials (such as proppant materials) present in the treatment fluid.

In some embodiments, the cellulose nanoparticles that may be used in the methods of the present disclosure include the nanocellulose materials that are described in U.S. Application Publication No. 2013/0274149, the disclosure of which is incorporated by reference herein in its entirety. For example, three suitable types of such nanocellulose materials are called nanocrystalline cellulose (NCC), microfibrillated cellulose (MFC), and bacterial cellulose (BC). Additional details regarding these materials are described in U.S. Pat. Nos. 4,341,807, 4,374,702, 4,378,381, 4,452,721, 4,452,722, 4,464,287, 4,483,743, 4,487,634 and 4,500,546, the disclosures of each of which are incorporated by reference herein in their entirety.

Briefly, suitable nanocellulose materials may have a repetitive unit of β-1,4 linked D glucose units, as seen in the following chemical structure:

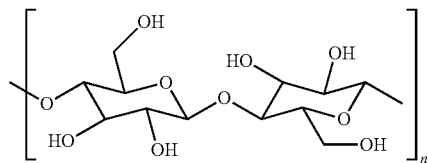

The integer values for the variable n relate to the length of the nanocellulose chains, which generally depends on the source of the cellulose and even the part of the plant containing the cellulose material.

Nanocrystalline cellulose (NCC), also referred to as cellulose nanocrystals, cellulose whiskers, or cellulose rod-like nanocrystals, may be obtained from cellulose fibers. Cellulose nanocrystals may have different shapes besides rods. Examples of these shapes include any nanocrystal in the shape of a 4-8 sided polygon, such as, a rectangle, hexagon or octagon. NCCs are generally made via the hydrolysis of cellulose fibers from various sources such as cotton, wood, wheat straw and cellulose from algae and bacteria. These cellulose fibers are characterized in having two distinct regions, an amorphous region and a crystalline region. In embodiments, the cellulose nanoparticles may include NCC prepared through acid hydrolysis of the amorphous regions of cellulose fibers that have a lower resistance to acid attack as compared to the crystalline regions of cellulose fibers. In some embodiments, the cellulose nanoparticles may include NCC particles with "rod-like" shapes (herein after referred to as "rod-like nanocrystalline cellulose particles" or more simply "NCC particles") having a crystalline structure.

In some embodiments, NCC particles with "rod-like" shapes (herein after referred to as "rod-like nanocrystalline cellulose particles" or more simply "NCC particles") having a crystalline structure may be comprised in the treatment fluid of the present disclosure along with the cellulosic fibers.

In some embodiments, the degree of crystallinity can vary from about 50% to about 95%, such as from about 65% to about 85%, or about 70% to about 80% by weight of the NCC particles. In some embodiments, the degree of crystallinity is from about 85% to about 95% such as from about 88% to about 95% by weight NCC particles.

Techniques that may be used to determine NCC particle size are scanning electron microscopy (SEM), transmission electron microscopy (TEM) and/or atomic force microsocopy (AFM). Wide angle X-ray diffraction (WAXD) may be used to determine the degree of crystallinity.

Nanofibrillated cellulose (NFC) or Micro Fibrillated Cellulose (MFC), or nanofibrils (collectively hereinafter referred to as "MFC"), may also be used in the methods of the present disclosure. MFC is a form of nanocellulose derived from wood products, sugar beet, agricultural raw materials or waste products may also be used in the methods of the present disclosure. In MFC, the individual microfibrils have been incompletely or totally detached from each other. For example, the microfibrillated cellulose material may have an average diameter in a range of from about 5 nm to about 500 nm, such as in a range of from about 5 nm to about 250 nm, or in a range of from about 10 nm to about 100 nm. In some embodiments, the microfibrillated cellulose material may have an average diameter of from about 10 nm to about 60 nm. Furthermore, in MFC, the length may be up to 1 µm, such as from about 500 nm to about 1 µm, or from about 750 nm to about 1 µm. The ratio of length (L) to diameter (d) of the MFC may be from about 10 to about 200, such as from about 75 to about 150, or from about 100 to about 150.

One common way to produce MFC is the delamination of wood pulp by mechanical pressure before and/or after chemical or enzymatic treatment. Additional methods include grinding, homogenizing, intensification, hydrolysis/electrospinning and ionic liquids. Mechanical treatment of cellulosic fibers is very energy consuming and this has been a major impediment for commercial success. Additional manufacturing examples of MFC are described in WO 2007/091942, WO 2011/051882, U.S. Pat. No. 7,381,294 and U.S. Patent Application Pub. No. 2011/0036522, each of which is incorporated by reference herein in their entirety.

Bacterial nanocellulose may also be used in the methods of the present disclosure. Bacterial nanocellulose is a material obtained via a bacterial synthesis from low molecular weight sugar and alcohol for instance. The diameter of this nanocellulose is found to be about 20-100 nm in general. Characteristics of cellulose producing bacteria and agitated culture conditions are described in U.S. Pat. No. 4,863,565, the disclosure of which is incorporated by reference herein in its entirety. Bacterial cellulose nanoparticles are microfibrils secreted by various bacteria that have been separated from the bacterial bodies and growth medium. The resulting microfibrils are microns in length, have a large aspect ratio (greater than 50) with a morphology depending on the specific bacteria and culturing conditions.

While the discussion below identifies NCC particles as the particular cellulose nanoparticle being modified, other cellulose nanoparticle materials identified above may also be used.

In embodiments, modification/functionalization, such as surface-only modification, may be used to tailor the surface of a cellulose nanoparticle to form cellulose nanoparticle having a charged surface (for example, with a quantifiable zeta potential, such as a negative zeta potential, which, for example, may be in the range of from about −100 mV to about −10 mV, or in the range of from about −80 mV to about −30 mV, or in the range of from about −60 mV to about −40 mV, or such as a positive zeta potential, for example, in the range of about +100 mV to about +10 mV, or in the range of from about +80 mV to about +30 mV, or in the range of from about +60 mV to about +40 Mv). Such surface-only modification may be performed by a variety of methods, including, for example, functionalization with various anionic groups/chemical moieties, as desired.

In some embodiments, the NCC particle surfaces may have a percent surface functionalization of about 5 to about 90 percent, such as from of about 25 to about 75 percent, and or of about 40 to about 60 percent. In some embodiments, about 5 to about 90 percent of the hydroxyl groups on NCC particle surfaces may be chemically modified, 25 to about 75 percent of the hydroxyl groups on NCC particle surfaces may be chemically modified, or 40 to about 60 percent of the hydroxyl groups on NCC particle surfaces may be chemically modified.

In some embodiments, a negative zeta potential may be conferred to the NCC particle surface by attaining a percent surface functionalization with suitable anionic functional groups (such as, for example, carboxyl groups or sulfate groups), of about 5 to about 90 percent surface functionalization, such as from of about 25 to about 75 percent surface functionalization, and or of about 40 to about 60 percent surface functionalization. In some embodiments, about 5 to about 90 percent of the hydroxyl groups on NCC particle surface may be chemically modified to be suitable anionic functional groups, such as, for example, carboxyl groups or sulfate groups; or 25 to about 75 percent of the hydroxyl groups on NCC particle surfaces may be chemically modified to be a suitable anionic functional groups, such as, for example, carboxyl groups or sulfate groups; or 40 to about 60 percent of the hydroxyl groups on NCC particle surfaces may be chemically modified to be carboxyl groups. In some embodiments the primary alcohols are functionalized. In some embodiments not all alcohols are functionalized (e.g., secondary alcohols). In some embodiments only the primary alcohols are functionalized.

In some embodiments, a positive zeta potential may be conferred to the NCC particle surface by attaining a percent surface functionalization with suitable cationic functional groups (such as, for example, ammonium or amine groups), of about 5 to about 90 percent surface functionalization, such as from of about 25 to about 75 percent surface functionalization, and or of about 40 to about 60 percent surface functionalization. In some embodiments, about 5 to about 90 percent of the hydroxyl groups on NCC particle surface may be chemically modified to be suitable cationic functional groups, such as, for example, carboxyl groups or sulfate groups; or 25 to about 75 percent of the hydroxyl groups on NCC particle surfaces may be chemically modified to be a suitable cationic functional groups, such as, for example, amine groups; or 40 to about 60 percent of the hydroxyl groups on NCC particle surfaces may be chemically modified to be amine groups.

Fourier Transform Infrared (FT-IR) and Raman spectroscopies and/or other known methods may be used to assess percent surface functionalization, such as via investigation of vibrational modes and functional groups present on the NCC particles. Additionally, analysis of the local chemical composition of the cellulose, NCC particles may be carried out using energy-dispersive X-ray spectroscopy (EDS). The bulk chemical composition can be determined by elemental analysis (EA). Zeta potential measurements can be used with known instruments (such as, for example, with a Malvern 3000 Zetasizer) to determine the surface charge and density. Thermal gravimetric analysis (TGA) and differential scanning calorimetry (DSC) can be employed to understand changes in heat capacity and thermal stability.

The selection of specific chemicals and functional groups for surface modification and/or functionalization, and the extent of the surface modification and/or functionalization of cellulose nanoparticles will depend on a number of factors, such as, for example, the composition and pH of the treatment fluid, the downhole operation, the desired duration of the hindered aggregation or interaction tendency, and the temperature at which the particles are to be used.

In some embodiments, the NCC particle surfaces may have a percent surface functionalization with ionized surface groups of about 5 to about 90 percent, such as from of about 25 to about 75 percent, and or of about 40 to about 60 percent. In some embodiments, about 5 to about 90 percent of the hydroxyl groups on NCC particle surfaces may be chemically modified with ionized surface groups, 25 to about 75 percent of the hydroxyl groups on NCC particle surfaces may be chemically modified with ionized surface groups, or 40 to about 60 percent of the hydroxyl groups on NCC particle surfaces may be chemically modified with ionized surface groups.

In some embodiments, the surface of the NCC particles may be modified, such as by removing at least some of the charged surface moieties that may be present on the particles, and introducing various surface modifiers, functional groups, species and/or molecules that either enhance or minimize aggregation and/or flocculation of the NCC particles when dispersed in a solvent, such as an aqueous solvent.

The amount of the cellulose fibers and cellulose nanoparticles (such as NCC) to be included in the treatment fluids of the present disclosure may depend on a number of factors, including formation characteristics and conditions, the downhole equipment, the desired application, and other factors known to those skilled in the art. In some embodiments, the cellulose fibers and cellulose nanoparticles (such as NCC) may be included in the treatment fluid in an amount of from about 2 pounds to about 100 pounds per barrel of the fluid, such as in an amount of from about 4 pounds to about 60 pounds per barrel of the treatment fluid, or in an amount of from about 6 pounds to about 40 pounds per barrel of the treatment fluid.

Applications

As discussed above, in embodiments, the methods of the present disclosure relate to the use of a mixture of cellulose fibers and cellulose nanoparticles in multiple oilfield applications. For example, the mixture of cellulose fibers and cellulose nanoparticles of the present disclosure may be used as an additive in conventional well treatment fluids used in fracturing, cementing, sand control, shale stabilization, fines migration, drilling fluid, friction pressure reduction, loss circulation, well clean out, and the like. In some embodiments, the fluids, treatment fluids, or compositions of the present disclosure may comprise one or more separate types of mixtures of cellulose fibers and cellulose nanoparticles for the above-mentioned uses in an amount of from about 0.001 wt % to about 10 wt %, such as, about 0.01 wt % to about 10 wt %, about 0.1 wt % to about 5 wt %, or of from about 0.5 wt % to about 5 wt % based on the total weight of the fluid, treatment fluid, or composition.

For example, the mixtures of cellulose fibers and cellulose nanoparticles of the present disclosure may also be used in well treatment fluids as, for example, a viscosifying agent, proppant transport agent, a material strengthening agent (such as for structural reinforcement for cementing), a fluid loss reducing agent, friction reducer/drag reduction agent and/or gas mitigation agent. Surface modification of the cellulose fibers and cellulose nanoparticles may be employed to enhance or attenuate one or more of the properties of the cellulose fibers and cellulose nanoparticles in conjunction with the above uses, as desired.

Regarding cementing, the mixture of cellulose fibers and cellulose nanoparticles may be used to stabilize foamed cement slurry, as an additive for cement composite, to mitigate gas migration, to stabilize cement slurries and/or as an additive to reinforce a wellbore and/or a cement column. Surface modification of the cellulose fibers and cellulose nanoparticles may be employed to enhance or attenuate one or more of the properties of the cellulose nanoparticles in conjunction with the above uses, as desired.

In some embodiments, the mixture of cellulose fibers and cellulose nanoparticles may be incorporated into a spacer fluid, which is pumped between the mud and cement slurry to prevent contamination. The mixture of cellulose fibers and cellulose nanoparticles may be added to increase and/or maintain an effective viscosity to prevent the mud mixing with the cement.

In another embodiment, the mixture of cellulose fibers and cellulose nanoparticles may be used to increase the thermal stability of polymer fluids, such as those fluids that contain viscoelastic surfactant (VES). Surface modification of the cellulose fibers and cellulose nanoparticles (such as, for example, increasing or decreasing the charge density or the type of charge (anionic or cationic) on the surface of the cellulose nanoparticles) may be employed to enhance or attenuate one or more of the properties of the mixture of cellulose fibers and cellulose nanoparticles in conjunction with the above uses, as desired.

In another embodiment, the mixture of cellulose fibers and cellulose nanoparticles may be used to improve the transport and the suspension of various solid materials often included in the above well treatment fluids, to transport pill materials, proppant and gravel. Surface modification of the cellulose nanoparticles may be employed to enhance or attenuate one or more of the properties of the cellulose nanoparticles in conjunction with the above uses, as desired.

In another embodiment, the mixture of cellulose fibers and cellulose nanoparticles may be used to increase the viscosity of aqueous fluids and non-aqueous based fluids (i.e., oil-based fluids) in a time or condition dependent manner. In some embodiments, the fluids, treatment fluids, or compositions of the present disclosure may comprise one or more independent mixtures of cellulose fibers and cellulose nanoparticles for the above-mentioned uses in an amount of from about 0.001 wt % to about 10 wt %, such as, 0.01 wt % to about 10 wt %, about 0.1 wt % to about 5 wt %, or of from about 0.5 wt % to about 5 wt % based on the total weight of the fluid, treatment fluid, or composition.

The appropriate components and methods of patents and patent application publications (e.g., identified in the present disclosure) may be selected for the present disclosure in embodiments thereof. Methods and fluids for fracturing an unconsolidated formation that includes injection of consolidating fluids, as disclosed in U.S. Pat. No. 6,732,800, the disclosure of which is herein incorporated by reference in its entirety. Techniques and fluids for the stimulation of very low permeability formations, as disclosed in U.S. Pat. No. 7,806,182, the disclosure of which is herein incorporated by reference in its entirety. Techniques and fluids for fluid-loss control in hydraulic fracturing operations and/or controlling lost circulation are known in the art, as disclosed in U.S. Pat. Nos. 7,482,311, 7,971,644, 7,956,016, and 8,381,813 the disclosures of which are herein incorporated by reference in their entireties. Fracturing fluids using degradable polymers as viscosifying agents, as disclosed in U.S. Pat. No. 7,858,561, the disclosure of which is herein incorporated by reference in its entirety. Conventional fracturing fluid breaking technologies and the design of fracturing treatments as described in U.S. Pat. No. 7,337,839, the disclosure of which is hereby incorporated by reference in its entirety. Techniques and fluids for gravel packing a wellbore penetrating a subterranean formation, as disclosed in U.S. Pat. Nos. 8,322,419 and 8,490,697, and U.S. Patent Application Publication Nos. 2015/0308238; 2015/0198016; 2014/0014337; 2012/0048547; 2010/0096130; 2010/0314109; 20100018709; 2010/0139919; 2008/0128129; and 2005/0028978, the disclosures of which are hereby incorporated by reference in their entireties. Techniques and fluids for providing sand control within a well are known in the art, as disclosed in U.S. Pat. No. 6,752,206, the disclosure of which is herein incorporated by reference in its entirety. Techniques and compositions for drilling or cementing a wellbore are known in the art, as disclosed in U.S. Pat. No. 5,518,996, the disclosure of which is herein incorporated by reference in its entirety. The following are some of the known methods of acidizing hydrocarbon bearing formations which can be used as part of the present method: U.S. Pat. Nos. 3,215,199; 3,297,090; 3,307,630; 2,863,832; 2,910,436; 3,251,415; 3,441,085; and 3,451,818, the disclosures of which are hereby incorporated by reference in their entireties.

Known methods, fluids, systems and compositions, such as those disclosed in the patents and patent application publications identified above, may be modified to incorporate a mixture of cellulose fibers and cellulose nanoparticles; or a mixture of cellulose fibers and cellulose nanoparticles may be used as a substitute for one or more components, such as, for example, a viscosifying agent, a proppant transport agent, a material strengthening agent, a fluid loss reducing agent, a friction reducer/drag reduction agent, a gas mitigation agent an additive for a cement composite, and/or as an additive to reinforce a wellbore and/or a cement column, disclosed in the patents identified above.

In embodiments, the mixture of cellulose fibers and cellulose nanoparticles added to such known fluids and/or compositions either in a pre-hydrated form in water, such as deionized water, or directly to such known fluids and/or compositions as a powder.

While the methods and treatment fluids of the present disclosure are described herein as comprising a mixture of cellulose fibers and cellulose nanoparticles, it should be understood that the methods and fluids of the present disclosure may optionally comprise other additional materials, such as the materials and additional components discussed in the aforementioned patents.

In some embodiments, the mixture of cellulose fibers and cellulose nanoparticles may be pumped with a particulate material, such as proppant, such that the mixture of cellulose fibers and cellulose nanoparticles are uniformly mixed with the particulate material. In some embodiments, a dispersion of the mixture of cellulose fibers and cellulose nanoparticles and the proppant may be introduced, such as by pumping, into the subterranean formation. The terms "dispersion" and "dispersed" refer, for example, to a substantially uniform distribution of components in a mixture. In some embodiments, a dispersed phase of one or more mixtures of cellulose fibers and cellulose nanoparticles, and particulate material may be formed at the surface. An action or event occurring "at the surface" refers, for example, to an action or event that happens above ground, that is, not at an underground location, such as within the wellbore or within the subterranean formation.

In some embodiments, the mixture of cellulose fibers and cellulose nanoparticles may be mixed and dispersed throughout the entire batch of proppant to be pumped into the wellbore during the treatment operation. This may occur by adding the cellulose fibers and cellulose nanoparticles (either separately or as a mixture) to the proppant before it is mixed with the treatment fluid, adding the mixture of cellulose fibers and cellulose nanoparticles to the treatment fluid before it is mixed with the proppant, or by adding a slurry of mixture of cellulose fibers and cellulose nanoparticles at some other stage, such as either before the slurry is pumped downhole, or at a location downhole.

In some embodiments, the methods of the present disclosure may include the following actions, in any order: placing a treatment fluid including a mixture of cellulose fibers and cellulose nanoparticles and a particulate material into a subterranean formation via a wellbore; mixing the treatment fluid to form an association, such as a covalent association and/or non-covalent association, of the mixture of cellulose fibers and cellulose nanoparticles with the particulate material, wherein the mixture of cellulose fibers and cellulose nanoparticles optionally form an association, such as a covalent association and/or non-covalent association, with one or more particulate materials. The terms "placing" or "placed" refer to the addition of a treatment fluid to a subterranean formation by any suitable means and, unless stated otherwise, do not imply any order by which the actions occur. The term "introduced" refers when used in connection with the addition of a treatment fluid to a subterranean formation may imply an order of accomplishing the recited actions, if not stated otherwise.

In some embodiments, the association may be a non-covalent (and/or covalent) association in which one or more covalent bonds and/or one or more non-covalent bonds (such as an ionic bond, hydrogen bond or van der Waals forces) between the cellulose fibers and/or cellulose nanoparticles and/or a particulate material, such as a proppant or coated proppant, arise.

In some embodiments, the slurry of proppant and the mixture of cellulose fibers and cellulose nanoparticles may be pumped into the wellbore during a portion of the treatment operation, for example, as the last about 5 to about 25% of the proppant is placed into the fracture, such as to control flowback without using vast amounts of the mixture of cellulose fibers and cellulose nanoparticles. Such a slug may also be pumped into the wellbore at other stages, for example, to provide an absorbed scale inhibitor to be pumped to the front of the fracture.

In some embodiments, small slugs of a slurry of proppant and the mixture of cellulose fibers and cellulose nanoparticles may be pumped in between slugs of slurry of proppant, or small slugs of a slurry of the mixture of cellulose fibers and cellulose nanoparticles may be pumped between slugs of a proppant slurry. Such a series of stages may be used to control flow dynamics down the fracture, for example, by providing more plug flow-like behavior. Pumping of small slugs of slurry of the mixture of cellulose fibers and cellulose nanoparticles as the tail-in is an example of this type of procedure in a treatment operation.

In embodiments, a slurry of a mixture of proppant, cellulose fibers and cellulose nanoparticles may be used for any desired reason in the entire range of reservoir applications, such as from fracturing to sand control, frac-and-sand-pack and/or high permeability stimulation. For example, the methods of the present disclosure may be used in fluid loss applications.

The treatment fluid carrying the mixture of cellulose fibers and cellulose nanoparticles may be any well treatment fluid, such as a fluid loss control pill, a water control treatment fluid, a scale inhibition treatment fluid, a fracturing fluid, a gravel packing fluid, a drilling fluid, and a drill-in fluid. The carrier solvent (or carrier fluid) for the treatment fluid may be a pure solvent or a mixture. Suitable solvents for use with the methods of the present disclosure, such as for forming the treatment fluids disclosed herein, may be aqueous or organic based. Aqueous solvents may include at least one of fresh water, sea water, brine, mixtures of water and water-soluble organic compounds and mixtures thereof. Organic solvents may include any organic solvent that is able to dissolve or suspend the various components, such as the chemical entities and/or components of the treatment fluid.

In some embodiments, the carrier fluid may be a low viscosity fluid, such as slickwater, which may or may not contain a viscosifying agent, and a sufficient amount of a friction reducing agent, such as, for example, to minimize tubular friction pressures. In some embodiments, treatment fluids comprising a slickwater carrier fluid may have a viscosity that is slightly higher than unadulterated fresh water or brine.

As discussed in more detail below, a mixture of cellulose fibers and cellulose nanoparticles may perform a variety of intended functions when present in a treatment fluid, a few of which are illustrated in more detail below.

Fracturing Fluids

The fluids and/or methods of the present disclosure may be used for hydraulically fracturing a subterranean formation. Techniques for hydraulically fracturing a subterranean formation are known to persons of ordinary skill in the art, and involve pumping a fracturing fluid into the borehole and out into the surrounding formation. The fluid pressure is above the minimum in situ rock stress, thus creating or extending fractures in the formation. See Stimulation Engineering Handbook, John W. Ely, Pennwell Publishing Co., Tulsa, Okla. (1994), U.S. Pat. No. 5,551,516 (Normal et al.), "Oilfield Applications," Encyclopedia of Polymer Science and Engineering, vol. 10, pp. 328-366 (John Wiley & Sons, Inc. New York, N.Y., 1987) and references cited therein.

In some embodiments, hydraulic fracturing involves pumping a proppant-free viscous fluid, or pad—such as water with some fluid additives to generate high viscosity—into a well faster than the fluid can escape into the formation so that the pressure rises and the rock breaks, creating artificial fractures and/or enlarging existing fractures. Then, proppant particles are added to the fluid to form slurry that is pumped into the fracture to prevent it from closing when the pumping pressure is released. In the fracturing treatment, fluids of are used in the pad treatment, the proppant stage, or both.

In some embodiments, the fluids and/or methods of the present disclosure may be employed during a first stage of hydraulic fracturing, where a fluid is injected through wellbore into a subterranean formation at high rates and pressures. In such embodiments, the fracturing fluid injection rate exceeds the filtration rate into the formation producing increasing hydraulic pressure at the formation face. When the pressure exceeds a predetermined value, the formation strata or rock cracks and fractures. The formation fracture is more permeable than the formation porosity.

In some embodiments, the fluids and/or methods of the present disclosure may be employed during a later stage of hydraulic fracturing, such as where proppant is deposited in the fracture to prevent it from closing after injection stops. In embodiments, the proppant may be coated with a curable resin activated under downhole conditions. Different materials, such as bundles of fibers, or fibrous or deformable materials, may also be used in conjunction with the mixture of cellulose fibers and cellulose nanoparticles to retain proppants in the fracture. The mixture of cellulose fibers and cellulose nanoparticles and other materials, such as optional additional fibers, may form a three-dimensional network with the proppant, reinforcing it and limiting its flowback. At times, due to weather, humidity, contamination, or other environmental uncontrolled conditions, some of these materials can aggregate and/or agglomerate, making it difficult to control their accurate delivery to wellbores in well treatments.

In some embodiments, the amount of the cellulose fibers (alone, not counting the cellulose nanoparticles) in the fluids, treatment fluids, or compositions of the present disclosure may be an amount of from about 0.001 wt % to about 10 wt %, such as an amount of from about 0.01 wt % to about 10 wt %, or an amount of from about 0.1 wt % to about 5 wt %, or an amount of from about 0.5 wt % to about 2 wt % based on the total weight of the fluid, treatment fluid, or composition; in such embodiments, the amount of the cellulose nanoparticles (alone, not counting the cellulose fibers) in the fluids, treatment fluids, or compositions of the present disclosure may be an amount of from about 0.001 wt % to about 10 wt %, such as an amount of from about 0.01 wt % to about 10 wt %, or an amount of from about 0.1 wt % to about 5 wt %, or an amount of from about 0.5 wt % to about 2 wt % based on the total weight of the fluid, treatment fluid, or composition.

Sand, gravel, glass beads, walnut shells, ceramic particles, sintered bauxites, mica and other materials may be used as a proppant. In embodiments, the mixture of cellulose fibers and cellulose nanoparticles of the present disclosure may be used, such as in a fluid mixture, to assist in the transport proppant materials. In some embodiments, the fluids, treatment fluids, or compositions of the present disclosure may comprise one or more the mixtures of cellulose fibers and cellulose nanoparticles for the above-mentioned proppant-related uses in an amount of from about 0.001 wt % to about 10 wt %, such as, about 0.01 wt % to about 10 wt %, about 0.1 wt % to about 5 wt %, or of from about 0.5 wt % to about 5 wt % based on the total weight of the fluid, treatment fluid, or composition.

In some embodiments, the hydraulic fracturing fluids may be aqueous solutions containing a thickener (or rheology modifier), such as a solvatable polysaccharide, a solvatable synthetic polymer, or a viscoelastic surfactant, that when dissolved in water or brine provides sufficient viscosity to transport the proppant. Suitable thickeners/rheology modifiers may include polymers, such as guar (phytogeneous polysaccharide), and guar derivatives (hydroxypropyl guar, carboxymethylhydroxypropyl guar). Other synthetic polymers such as polyacrylamide copolymers can be used also as thickeners. Water with guar represents a linear gel with a viscosity proportional to the polymer concentration. Crosslinking agents are used which provide engagement between polymer chains to form sufficiently strong couplings that increase the gel viscosity and create visco-elasticity. Common crosslinking agents for guar and its derivatives and synthetic polymers include boron, titanium, zirconium, and aluminum. Another class of non-polymeric viscosifiers includes the use of viscoelastic surfactants that form elongated micelles. Known hydraulic fracturing fluids, may be modified to incorporate a mixture of cellulose fibers and cellulose nanoparticles as a supplement to the thickener; or a mixture of cellulose fibers and cellulose nanoparticles may be used as a substitute for a conventional thickener, for example, a substitute for one or more of the above mentioned thickeners.

Further, disclosed herein are methods and fluids (such as well treatment fluids) for treating a subterranean formation in which a mixture of cellulose fibers and cellulose nanoparticles of the present disclosure may be used as additive to the polymer fluid to potentially increase the viscosity of the formulation by forming an entangled network between the cellulose fibers and cellulose nanoparticles and the polymer in solution (by generation of an increase in initial viscosity prior to the addition of a metallic crosslinker, such as, for example, boron, titanium, zirconium, and aluminum).

Fluids incorporating a mixture of cellulose fibers and cellulose nanoparticles of the present disclosure may have any suitable viscosity, such as a viscosity value of about 50 mPa·s or greater at a shear rate of about 100 s$^{-1}$ at treatment temperature, or about 75 mPa·s or greater at a shear rate of about 100 s$^{-1}$ at the treatment temperature, or about 100 mPa·s or greater at a shear rate of about 100 s$^{-1}$ at the treatment temperature, in some instances.

In some embodiments, an aqueous fracturing fluid comprising at least an aqueous base fluid, a proppant, a viscosifier/rheology modifier, a mixture of cellulose fibers and cellulose nanoparticles of the present disclosure (for example, functioning as a flowback aid) and optionally further components may be prepared using conventional equipment and techniques. The components may be added in any order. The fluid may then be thoroughly mixed and a proppant is added. The specific composition of the aqueous fracturing fluid and the concentrations of the components used are chosen by the skilled artisan according to the intended results of the fracturing job.

The fracturing fluid may be pumped into a wellbore at a rate and pressure sufficient to flow into the formation and to initiate or extend a fracture in the formation. In order to initiate or to extend fractures in the formation of a bottomhole, pressure sufficient to open a fracture in the formation may be used. The bottomhole pressure may be determined by the surface pressure produced by the surface pumping equipment and the hydrostatic pressure of the fluid column in the wellbore, less any pressure loss caused by friction. The minimum bottomhole pressure used to initiate and/or to extend fractures may be determined by formation properties and therefore may vary from application to application. Methods and equipment for fracturing procedures are known. The fracturing fluid simultaneously transports suspended proppants and the proppant becomes deposited into the fractures and holds fractures open after the pressure exerted on the fracturing fluid has been released. Thereafter, the applied pressure is reduced thereby allowing at least a portion of the injected fracturing fluid to flow back from the formation into the wellbore. Reducing the pressure allows the fractures to close. Proppant "props" fractures open and fracturing fluid is shut in or allowed to flow back. At the surface, chokes may be used to generate a pressure differential to allow fluid to begin to flow from the formation into the well bore.

The mixture of cellulose fibers and cellulose nanoparticles of the present disclosure used in the fracturing fluid may facilitate the removal of the fracturing fluid injected. The addition of the mixture of cellulose fibers and cellulose nanoparticles of the present disclosure improves the fluid recovery and improves regained permeability. In some embodiments, the percent regained permeability may be in a range of from about 15% to about 80%, such as in a range of from about 30% to about 65%, or in a range of from about 40% to about 55%.

Thereafter, the aqueous fracturing fluid flowing back from the formation into the wellbore may be removed from the wellbore. The total amount of fluid recovered may depend on the formation, for instance on how much water the formation absorbs into its structure. The addition of the mixture of cellulose fibers and cellulose nanoparticles of the present disclosure enhances the amount of fluid recovered compared to using a fracturing fluid in which the mixture of cellulose fibers and cellulose nanoparticles of the present disclosure are not present.

Cementing

The mixture of cellulose fibers and cellulose nanoparticles may also be used as an additive in a cementing composition. Generally cementing a well includes pumping a cement slurry from the surface down the casing so that it then returns towards the surface via the annulus between the casing and the borehole. One of the purposes of cementing a well is to isolate the different formation layers traversed by the well to prevent fluid or gas migration between the different geological layers or between the layers and the surface. For safety reasons, prevention of any gas rising through the annulus between the borehole wall and the casing is desirable.

When the cement has set, it is impermeable to gas. Because of the hydraulic pressure of the height of the cement column, the injected slurry is also capable of preventing such migration. However, there is a phase, between these two states which could last several hours during which the cement slurry no longer behaves as a liquid but also does not yet behave as an impermeable solid. For this reason, additives, such as those described in U.S. Pat. Nos. 4,537,918, 6,235,809 and 8,020,618, the disclosures of which are incorporated by reference herein their entirety, may be added to maintain a gas-tight seal during the whole cement setting period.

The concept of fluid loss is also observed in cement slurries. Fluid loss occurs when the cement slurry comes into contact with a highly porous or fissured formation. Fluid from the cement slurry will migrate into the formation altering the properties of the slurry. When fluid loss occurs it makes the cement harden faster than it is supposed to, which could lead to incomplete placement. Fluid loss control additives (such as, for example, substituted glycine, FLAC, crosslinked PVA, HEC, and AMPS/acrylamide copolymer) may be used to prevent or at least limit the fluid loss that may be sustained by the cement slurry during placement and its setting.

A variety of hydraulic cements can be utilized in accordance with the present application including, for example, Portland cements, slag cements, silica cements, pozzolana cements and aluminous cements. Specific examples of Portland cements include Classes A, B, C, G and H.

In embodiments, the fluids, treatment fluids, or compositions of the present disclosure may contain a foaming and/or stabilizing additive comprising a mixture of cellulose fibers and cellulose nanoparticles, the mixture of cellulose fibers and cellulose nanoparticles being present in an amount of from about 5 wt % to about 70 wt %, of from about 10 wt % to about 60 wt %, of from about 20 wt % to about 50 wt %, or of from about 30 wt % to about 40 wt % based on the total weight of the fluid, treatment fluid, or composition. In some embodiments, the fluids, treatment fluids, or compositions of the present disclosure may contain a foaming and/or stabilizing additive comprising a mixture of cellulose fibers and cellulose nanoparticles, the mixture of cellulose fibers and cellulose nanoparticles being present in an amount of from about 0.001 wt % to about 10 wt %, such as, about 0.01 wt % to about 10 wt %, about 0.1 wt % to about 5 wt %, or of from about 0.5 wt % to about 5 wt % based on the total weight of the fluid, treatment fluid, or composition.

The mixture of cellulose fibers and cellulose nanoparticles may act as a binder or surface activating agent for various cement composites and potentially increase the affinity between the two different phases in the cement composites. Therefore, in addition to reinforcing set cement prepared based on conventional formulations, the presence of the mixture of cellulose fibers and cellulose nanoparticles may allow components with sharply-contrasting properties to co-exist in the composite formulations. For instance, hydrophobic monomers like styrene can now be mixed with slurries and cured to form new types of cement composites.

According to the present disclosure, the slurry cement composition for cementing a well may comprise a hydraulic cement, water, a mixture of cellulose fibers and cellulose nanoparticles and graphite. Graphite may be used as a coarse particulate graphite average diameter is around 70 to 500 μm for the particle size.

Portland cement containing carbon fiber and particulate graphite demonstrates reduced cement resistivity values, when compared to the resistivity values of conventional cement with no fibers or graphite present. Small concentrations of carbon fiber provide a connective path through the cement matrix for electrons to flow.

Other additives may be present in the blend, such as fillers, retarders, fluid loss prevention agents, dispersants, rheology modifiers and the like. In one embodiment, the blend also includes a polyvinyl alcohol fluid loss additive (0.1% to 1.6%) by weight of blend ("BWOB"), polysulfonate dispersant (0.5-1.5% BWOB), carbon black conductive filler aid not exceeding 1.0% BWOB, and various retarders (lignosulfonate, short-chain purified sugars with terminal carboxylate groups, and other proprietary synthetic retarder additives). In another embodiment, the blend also includes a PVA containing fluid loss additive (0.2-0.3% by weight of blend ("BWOB"), polysulfonate dispersant (0.5-1.5% BWOB), carbon black conductive filler aid not exceeding 1.0% BWOB, and various retarders (lignosulfonate, short-chain purified sugars with terminal carboxylate groups, and other proprietary synthetic retarder additives). In some formulations, silica or other weighting additives, such as hematite or barite, may be used to optimize density of the cement composite slurry during placement across the zone of interest. Any suitable silica concentrations may be used. In some embodiments, the silica concentrations may not exceed 40% BWOC (by weight of cement). This is done to prevent strength retrogression when well temperatures may exceed 230° F. For most formulations, hematite or barite does not exceed 25% BWOB or BWOC.

In embodiments, the fluids, treatment fluids, or compositions of the present disclosure may contain a mixture of cellulose fibers and cellulose nanoparticles, the mixture of cellulose fibers and cellulose nanoparticles being present in an amount of from about 5 wt % to about 70 wt %, of from about 10 wt % to about 60 wt %, of from about 20 wt % to about 50 wt %, or of from about 30 wt % to about 40 wt % based on the total weight of the fluid, treatment fluid, or composition. In some embodiments, the fluids, treatment fluids, or compositions of the present disclosure may contain a mixture of cellulose fibers and cellulose nanoparticles being present in an amount of from about 0.001 wt % to about 10 wt %, such as, about 0.01 wt % to about 10 wt %, about 0.1 wt % to about 5 wt %, or of from about 0.5 wt % to about 5 wt % based on the total weight of the fluid, treatment fluid, or composition.

In some embodiments, the amount of the cellulose fibers (alone, not counting the cellulose nanoparticles) in the fluids, treatment fluids, or compositions of the present disclosure may be an amount of from about 0.001 wt % to about 10 wt %, such as an amount of from about 0.01 wt % to about 10 wt %, or an amount of from about 0.1 wt % to about 5 wt %, or an amount of from about 0.5 wt % to about 2 wt % based on the total weight of the fluid, treatment fluid, or composition; in such embodiments, the amount of the cellulose nanoparticles (alone, not counting the cellulose fibers) in the fluids, treatment fluids, or compositions of the present disclosure may be an amount of from about 0.001 wt % to about 10 wt %, such as an amount of from about 0.01 wt % to about 10 wt %, or an amount of from about 0.1 wt % to about 5 wt %, or an amount of from about 0.5 wt % to about 2 wt % based on the total weight of the fluid, treatment fluid, or composition.

Fracture Plugging

Fractures in reservoirs normally have the highest flow capacity of any portion of the reservoir formation. These fractures in the formation may be natural or hydraulically generated. In a natural fault in the rock structure, the high flow capacity results either from the same factors as for natural fractures or from the fracture being open for example due to natural asperities or because the rock is hard and the closure stress is low. In artificially created fractures, such as those created by hydraulic fracturing or acid fracturing, the high flow capacity results from the fracture being either propped with a very permeable bed of material or etched along the fracture face with acid or other material that has dissolved part of the formation.

Fractures of interest in this field may be connected to the subterranean formation and/or to the wellbore. Large volumes of fluids will travel through fractures due to their high flow capacity. This allows wells to have high fluid rates for production or injection. Normally, this is desirable.

However, in the course of creating or using an oil or gas well, it is often desirable to plug or partially plug a fracture in the rock formations, thereby reducing its flow capacity. Reasons for plugging these fractures may include a) they are producing unwanted water or gas, b) there is non-uniformity of injected fluid (such as water or $CO_2$) in an enhanced recovery flood, or c) expensive materials (such as hydraulic fracturing fluids during fracturing) are being injected into non-producing areas of the formation. This latter case can be particularly deleterious if it results in undesirable fracture growth because it wastes manpower, hydraulic horsepower, and materials, to produce a fracture where it is not wanted, and at worst it results in the growth of a fracture into a region from which undesirable fluids, such as water, are produced.

In embodiments, after well treatment composition is placed in the wellbore or the subterranean formation, at least one plug may be formed in at least one of a perforation, a fracture or the wellbore. The at least one plug is comprised of at least a mixture of cellulose fibers and cellulose nanoparticles of the well treatment composition, and may be installed for diversion and/or the isolation of various zones in the wellbore or the subterranean formation. Also, after the placement, the fracture may close on the mixture of cellulose fibers and cellulose nanoparticles after the well treatment composition is introduced into the fracture. Furthermore, the plug may be plurality of plugs, thus isolating one or more regions within the subterranean formation or wellbore.

To prevent particle separation and uneven packing during mixing and injection of the mixture of cellulose fibers and cellulose nanoparticles, the densities of the particulates (such as proppants), cellulose fibers and cellulose nanoparticles should be within about 20% of one another other. Particles are mixed and pumped using equipment and procedures commonly used in the oilfield for cementing, hydraulic fracturing, drilling, and acidizing. These particles may be pre-mixed or mixed on site. They are generally mixed and pumped as a slurry in a carrier fluid such as water, oil, viscosified water, viscosified oil, and slick water (water containing a small amount of polymer that serves primarily as a friction reducer rather than primarily as a viscosifier). In embodiments, the well treatment composition may also comprise a carrier fluid that is not capable of dissolving or disintegrating the cellulose fibers and cellulose nanoparticles.

Unless the particles have a very low density, and/or the carrier fluid has a very high density, and/or the pump rate is very high, the carrier fluid will normally be viscosified in order to help suspend the particles. Any method of viscosifying the carrier fluid may be used. Water may be viscosified with a non-crosslinked or a crosslinked polymer. The polymer, especially if it is crosslinked, may remain and be concentrated in the fracture after the treatment and help impede fluid flow. In fracturing, polymers may be cross-linked to increase viscosity with a minimum of polymer. In embodiments, the more polymer may be better than less, unless cost prevents it, and crosslinking adds cost and complexity, so uncrosslinked fluids can be also desirable, bearing in mind that more viscous fluids tend to widen fractures, which may be undesirable.)

In fracturing, it is desirable for the polymer to decompose after the treatment, so the least thermally stable polymer that will survive long enough to place the proppant is often chosen. In embodiments, stable polymers, such as polyacrylamides, substituted polyacrylamides, and others may be advantageous. The choice of polymer, its concentration, and crosslinker, if any, is made by balancing these factors for effectiveness, taking cost, expediency, and simplicity into account Placement of the mixture of cellulose fibers and cellulose nanoparticles plugging material is similar to the placement of proppant in hydraulic fracturing. The plugging material may be suspended in a carrier fluid to form a "filling slurry". If a fracture is being created and plugged at the same time, a "Property3D" (P3D) hydraulic fracture simulator may be used to design the fracture job and simulate the final fracture geometry and filling material placement. (If an existing fracture is being plugged, a simulator is not normally used.) Examples of such a P3D simulator are FRACADE (Schlumberger proprietary fracture design, prediction and treatment-monitoring software), FRACPRO sold by Pinnacle Technologies, Houston, Tex., USA, and MFRAC from Meyer and Associates, Inc., USA. Whether a fracture is being created and plugged in a single operation, or an existing fracture is being plugged, the fracture wall should be covered top-to-bottom and end-to-end ("length and height") with filling slurry where the unwanted fluid flow is expected. Generally, the width of the created fracture is not completely filled with the well treatment composition, but it may be desirable to ensure that enough material is pumped to (i) at a minimum (should the fracture close after placement of the well treatment composition) create a full layer of the largest ("coarse") size material used across the entire length and height of the region of the fracture where flow is to be impeded, or to (ii) fill the fracture volume totally with well treatment composition. When at least situation (i) has been achieved, the fracture will be said to be filled with at least a monolayer of coarse particles.

The normal maximum concentration utilized may be three layers (between the faces of the fracture) of the coarse material. If the fracture is wider than this, but will close, three layers of the filling material may be used, provided that after the fracture closes the entire length and height of the fracture walls are covered. If the fracture is wider than this, and the fracture will not subsequently close, then either (i) more filling material may be pumped to fill the fracture, or (ii) some other material may be used to fill the fracture, such as for example, the malleable material described above. More than three layers may be wasteful of particulate material, may allow for a greater opportunity of inadvertent undesirable voids in the particle pack, and may allow flowback of particulate material into the wellbore. Therefore, especially if the fracture volume filled-width is three times the largest particle size or greater, then a malleable bridging material may be added to reduce the flow of particles into the wellbore. This should be a material that does not increase the porosity of the pack on closure. Malleable polymeric or organic fibers are products that effectively accomplish this. Concentrations of up to about 9.6 g malleable bridging material per liter of carrier fluid may be used.

The carrier fluid may be any conventional fracturing fluid that will allow for material transport to entirely cover the fracture, will stay in the fracture, and will maintain the material in suspension while the fracture closes. Crosslinked guars or other polysaccharides may be used. Examples of suitable materials include crosslinked polyacrylamide or crosslinked polyacrylamides with additional groups such as AMPS to impart even greater chemical and thermal stability. Such materials may (1) concentrate in the fracture, (2) resist degradation, and provide additional fluid flow resistance in the pore volume not filled by particles. Additionally, wall-building materials, such as fluid loss additives, may be used to further impede flow from the formation into the fracture. Wall-building materials such as starch, mica, and carbonates are well known.

Often it is desirable to plug a portion of the fracture; this occurs in particular when the fracture is growing out of the desired region into a region in which a fracture through which fluid can flow is undesirable. This can be achieved using the well treatment composition described above if the area to be plugged is at the top or at the bottom of the fracture. There are two techniques to achieve this; each may be used with either a cased/perforated completion or an open hole completion. In the first ("specific gravity") technique the bridging slurry is pumped before pumping of the main fracture slurry and has a specific gravity different from that of the main fracture slurry. If the filling slurry is heavier than the main fracture slurry, then the plugged portion of the fracture will be at the bottom of the fracture. If the filling slurry is lighter than the main fracture slurry, then the plugged portion of the fracture will be at the top of the fracture. The filling slurry will be inherently lighter or heavier than the proppant slurry simply because the particles are lighter or heavier than the proppant; the difference may be enhanced by also changing the specific gravity of the carrier fluid for the particles relative to the specific gravity of the carrier fluid for the proppant.

The second ("placement") technique is to run tubing into the wellbore to a point above or below the perforations. If the aim is to plug the bottom of the fracture, then the tubing is run in to a point below the perforations, and the bridging slurry is pumped down the tubing while the primary fracture treatment slurry is being pumped down the annulus between the tubing and the casing. This forces the filling slurry into the lower portion of the fracture. If the aim is to plug the top of the fracture, then the tubing is run into the wellbore to a point above the perforations. Then, when the filling slurry is pumped down the tubing while the primary fracture treatment slurry is being pumped down the annulus between the tubing and the casing, the filling slurry is forced into the upper portion of the fracture. The tubing may be moved during this operation to aid placement of the particles across the entire undesired portion of the fracture. Coiled tubing may be used in the placement technique.

In embodiments, the fluids, treatment fluids, or compositions of the present disclosure may contain a mixture of cellulose fibers and cellulose nanoparticles (for forming plugs) in an amount of from about 5 wt % to about 70 wt %, of from about 10 wt % to about 60 wt %, of from about 20 wt % to about 50 wt %, or of from about 30 wt % to about 40 wt % based on the total weight of the fluid, treatment fluid, or composition. In some embodiments, the fluids, treatment fluids, or compositions of the present disclosure may contain a mixture of cellulose fibers and cellulose nanoparticles (for forming plugs) in an amount of from about 0.001 wt % to about 10 wt %, such as, about 0.01 wt % to about 10 wt %, about 0.1 wt % to about 5 wt %, or of from about 0.5 wt % to about 5 wt % based on the total weight of the fluid, treatment fluid, or composition.

In some embodiments, the amount of the cellulose fibers (alone, not counting the cellulose nanoparticles) in the fluids, treatment fluids, or compositions of the present disclosure may be an amount of from about 0.001 wt % to about 10 wt %, such as an amount of from about 0.01 wt % to about 10 wt %, or an amount of from about 0.1 wt % to about 5 wt %, or an amount of from about 0.5 wt % to about 2 wt % based on the total weight of the fluid, treatment fluid, or composition; in such embodiments, the amount of the cellulose nanoparticles (alone, not counting the cellulose fibers) in the fluids, treatment fluids, or compositions of the present disclosure may be an amount of from about 0.001 wt % to about 10 wt %, such as an amount of from about 0.01 wt % to about 10 wt %, or an amount of from about 0.1 wt % to about 5 wt %, or an amount of from about 0.5 wt % to about 2 wt % based on the total weight of the fluid, treatment fluid, or composition.

Gravel Packing

The mixture of cellulose fibers and cellulose nanoparticles of the present disclosure may be incorporated into a gravel packing fluid, such as, for example, a gravel packing fluid used in conjunction with an assembly, a system, and a method for gravel packing. The gravel packing methodology of the present disclosure may include a fluid and/or treatment fluid comprising a cellulose fiber and a cellulose nanoparticle, such as a NCC particle, (for example, in the aforementioned amounts and/or ratios) but otherwise use conventional gravel packing compositions/techniques known in the art, such as those that are described in U.S. Pat. Nos. 8,322,419 and 8,490,697, and U.S. Patent Application Publication Nos. 2015/0308238, 2015/0198016, 2014/0014337, 2012/0048547, 2010/0096130, 2010/0314109, 20100018709, 2010/0139919, 2008/0128129, and 2005/0028978, the disclosures of which are incorporated by reference herein in their entireties.

In embodiments, a gravel packing fluid comprising a mixture of cellulose fibers and cellulose nanoparticles of the present disclosure may be used in an alternate-path gravel packing procedure (such as described in the aforementioned patents and patent application publications, and described below in more detail), and/or an alpha-beta wave procedure (such as described in the aforementioned patents and patent application publications; for example, where a mixture of cellulose fibers and cellulose nanoparticles may be incorporated into one or more of the fluids, as desired, such as incorporated into one or more alpha/beta wave water pack fluids (such as, for example, in a horizontal gravel packing operations, to adjust the shear forces of the slurry fluid flow to adjust the equilibrium gravel height and/or the alpha wave progression).

In some embodiments, a gravel packing fluid, which may comprise a mixture of cellulose fibers and cellulose nanoparticles, may be pumped down a well system having a screen shunt tube configuration (for example, an alternate-path gravel packing procedure). The shunt tube configuration may provide an open path continuously along the length of a screen. As the pumped gravel packing fluid passes through the shunt tube(s) and reaches a point at which the system is not gravel packed, the pumped fluid may exit the shunt tube(s) and force its way into the incompletely packed volume to further pack the system. In some embodiments, the shunt tube(s) may provide a complete pack around a screen by pumping a gravel packing fluid, which may comprise a mixture of cellulose fibers and cellulose nanoparticles, down the shunt tubes to fill in any voids.

In some embodiments, the methods of the present disclosure may employ alternate path gravel placement technology in conjunction with multilateral junctions. Such methodology may be used to gravel pack in open hole legs of a multilateral well in a manner that extends the application window of multilateral technologies while increasing the potential for reducing field development related resources. For example, in some embodiments, a gravel packing fluid, which may comprise a mixture of cellulose fibers and cellulose nanoparticles, may be pumped down one or more alternate paths created with shunts which have nozzles and are disposed outside a gravel pack screen assembly. The one or more shunts may provide an alternate pathway for a gravel slurry of the gravel packing fluid (which, if desired, may include a mixture of cellulose fibers and cellulose nanoparticles), to bypass premature bridging and to fill voids, thus resulting in a tight and complete gravel pack in an uncased, e.g. open hole, lateral wellbore.

In some embodiments, gravel placement may initially proceed in a standard gravel packing mode until screen out. A pressure buildup may occur after screen out and force the gravel slurry of the gravel packing fluid (which, if desired, may include a mixture of cellulose fibers and cellulose nanoparticles) to flow through shunt tubes and to exit through the nozzles into the first available void. The gravel packing operation may continue until the voids are filled and a final screen out occurs. By providing a mechanism able to eliminate voids in the gravel, the final gravel pack may be substantially improved.

In some embodiments, a lateral wellbore completion apparatus may be provided with a crossover device positioned inside the open hole section of the lateral wellbore. The slurry (which, if desired, may include a mixture of cellulose fibers and cellulose nanoparticles) may be directly introduced into the shunt tubes from a service tool via the crossover device, and the slurry may be allowed to enter the open hole annulus from the shunt tubes alone, if desired. With this approach, no pressure buildup external to the gravel pack assembly may be employed to force the gravel pack slurry along the shunt tubes. Instead, the pressure employed to force the slurry through the shunt tubes is maintained within the service tool and screen assembly. Additionally, the crossover device and shunt tubes protect the open wellbore wall from contact with the slurry in a destructive manner. Effectively, the equipment prevents uncontrolled flow of slurry against the surrounding formation of the open wellbore, thus preventing degradation and/or collapse of the lateral wellbore.

In some embodiments, a gravel packing system of the present disclosure may be deployed in a wellbore (such as a lateral wellbore) of a well, such as a multilateral well. In embodiments, the system of the present disclosure may be a gravel packing system as described in U.S. Pat. No. 8,490,697, the disclosure of which is herein incorporated by reference in its entirety. Briefly, such as system may comprise a lateral wellbore completion apparatus, which is used to establish a uniform, reliable gravel pack in an annulus surrounding at least a portion of the lateral wellbore completion. The lateral wellbore may be an upper lateral wellbore of a multilateral well.

In some embodiments, the lateral wellbore completion may comprise a variety of known components designed to facilitate application of the uniform gravel pack without voids in an open lateral wellbore. For example, wellbore completion may comprise an open hole packer that may be expanded against a surrounding wall of open hole lateral wellbore to isolate an annulus. Wellbore completion may also comprise a screen section formed of one or more individual screens disposed in the region to receive gravel pack. Between the open hole packer and the screen section, various known components may be positioned to facilitate creation of the alternate path for directing a gravel slurry, which may include a mixture of cellulose fibers and cellulose nanoparticles.

For example, a crossover system may be employed to direct slurry from an interior of a lateral wellbore completion to an alternate path system and ultimately into the surrounding annulus. The crossover system may be constructed in a variety of known forms, for example, in some embodiments, the crossover system may comprise a shrouded circulating housing. The shrouded circulating housing may comprise a shroud and a flow control device, such as a port closure sleeve mechanism. The sliding sleeve mechanism may be controlled to selectively allow flow of gravel slurry from an interior flow area of lateral wellbore completion into the shroud. From the interior of the shroud, the gravel slurry, which may include a mixture of cellulose fibers and cellulose nanoparticles, may flow into any suitable alternate path system, for example, an alternate path system as described in U.S. Pat. No. 8,490,697, the disclosure of which is herein incorporated by reference in its entirety, for uniform distribution along annulus around screen section.

For example, a suitable alternate path system may comprise one or more shunt tubes that are coupled to shroud of shrouded circulating housing. The shunt tubes may be designed to deliver the gravel slurry to the desired gravel pack region by providing a shunted space out tubing section and a shunted blank section with nozzles. Other components of lateral wellbore completion may comprise a polished bore receptacle positioned adjacent the shrouded circulating housing to receive a gravel pack service tool which may be selectively moved into the wellbore completion to deliver the gravel slurry, which may include a mixture of cellulose fibers and cellulose nanoparticles. A blank pipe section may be disposed between the open hole packer and the polished bore receptacle. Additionally, a large bore flapper valve, or another suitable valve, may be positioned in the interior flow area of wellbore completion between the shroud and screen section. The large bore flapper valve may be selectively activated to control the flow of fluid along the interior flow area. For example, the flapper valve may be used to facilitate flow of gravel slurry (which may include a mixture of cellulose fibers and cellulose nanoparticles) into the shunt tubes.

In some embodiments, additional components may be incorporated into lateral wellbore completion depending on the parameters of a given gravel packing operation and the environment in which the gravel pack is formed. For example, in some embodiments, the design of lateral wellbore completion may by selected to enable the gravel slurry (which may include a mixture of cellulose fibers and cellulose nanoparticles) to be forced into the desired gravel pack area through the alternate path system without application of pressure to a surrounding formation.

In some embodiments, the components (and concentration thereof) of the gravel packing fluid may be selected such that the mixture suspends the gravel as the fluid travels through the shunts and into the wellbore, even at high temperatures, such as temperatures in excess of about 180° F. (such as temperatures in the range of about 180° F. to about 280° F., or temperatures in the range of about 180° F. to about 240° F.), without serious thinning. For example, the components of the gravel packing fluid may be selected to include an amount of a mixture of cellulose fibers and cellulose nanoparticles effective to suspend the gravel in the fluid at high temperatures, such as temperatures in excess of about 180° F. (such as temperatures in the range of about 180° F. to about 280° F., or temperatures in the range of about 180° F. to about 240° F.), without serious thinning, such that the gravel does not deposit in the shunt tubes. Otherwise, the gravel would have a tendency to deposit in the shunt tubes during a shut in and/or at high temperatures (such as those described above) causing the shunt tubes to be packed closed before the gravel pack in the wellbore is complete. This may result in voids in the gravel pack and reduce the effectiveness of the gravel pack to control production of formation sands.

In some embodiments, a packer may be positioned and set in a casing above the sand screen to isolate the interval being packed. A crossover service tool may also be provided with an assembly to selectively allow fluids to flow between the annulus formed by the open hole and the screen assembly and the interior of a tubular member and a wash pipe. With the sand control screen assembly in place, a gravel packing fluid, such as a gravel packing fluid containing gravel (and optionally a mixture of cellulose fibers and cellulose nanoparticles) for forming the gravel pack and a water-based carrier fluid may be introduced into the wellbore to facilitate gravel packing of the open hole section of the wellbore in the annulus surrounding the sand control screen. The gravel packing fluid may be introduced into a tubular member where it flows to the cross over tool into the annulus of the open hole section below the packer and the exterior of the sand control screen. As the gravel (and the optional mixture of cellulose fibers and cellulose nanoparticles, if selected such that it will effectively settle with the gravel) settles within the open hole section surrounding the screen, a carrier fluid of the gravel packing fluid may pass through the screen and into the interior of the tubular member. The carrier fluid may be conducted to the crossover tool and into the annulus between the casing and the tubular member above the packer. In some embodiments, the cellulose fibers may be sized so that they will not pass through the screen openings.

In some embodiments, the gravel particles may be ceramics, natural sand or other particulate materials suitable for such purposes. The gravel particles may be sized so that they will not pass through the screen openings. Suitable particle sizes in U.S. mesh size may range from about 12 mesh (1.68 mm) to about 70 mesh (0.210 mm). A combination of different particle sizes may be used. Examples of typical particle size combinations for the gravel particles may about 12/20 mesh (1.68 mm/0.841 mm), 16/20 mesh (1.19 mm/0.841 mm), 16/30 mesh (1.19 mm/0.595 mm), 20/40 mesh (0.841 mm/0.420 mm), 30/50 mesh (0.595 mm/0.297 mm), 40/60 mesh (0.420 mm/0.250 mm) and 40/70 mesh (0.420 mm/0.210 mm). The gravel particles may be coated with a resin to facilitate binding of the particles together, and/or interaction with the mixture of cellulose fibers and cellulose nanoparticles.

The carrier fluid of the gravel packing fluid may be a water-based fluid or aqueous fluid, which may be composed of an aqueous brine or salt solution. The carrier fluid may have any suitable density, such as a fluid density in a range of from about 8.8 ppg (1.05 kg/L) to about 19.2 ppg (2.3 kg/L), or from about 8.8 ppg (1.05 kg/L) to about 14.2 ppg (1.70 kg/L).

In some embodiments, the aqueous carrier fluid may also be viscosified with a viscosifying agent (in addition to the mixture of cellulose fibers and cellulose nanoparticles, if present in the aqueous carrier fluid). The amount and type of viscosifying agent is selected to provide the desired carrying effect for the gravel particles and to ensure efficient return of the carrier fluid. The viscosifying agents may include those described in U.S. Patent Application Publication No. 2009/0065207, the disclosure of which is herein incorporated by reference in its entirety.

In some embodiments, the viscosifying agent may be present in an amount of from about 0.1 wt. % to about 1.5 wt. % of total weight of the carrier fluid, from about 0.1 wt. % to about 0.7 wt. % of total weight of carrier fluid, from about 0.1 wt. % to about 0.6 wt. % of total weight of carrier fluid, from about 0.1 wt. % to about 0.5 wt. % of total weight of carrier fluid, from about 0.1 wt. % to about 0.4 wt. % total weight of carrier fluid, from about 0.1 wt. % to about 0.3 wt. % of total weight of carrier fluid, or even from about 0.1 wt. % to about 0.2 wt. % of total weight of carrier fluid. In some embodiments, a viscoelastic surfactant (VES) may be used as a viscosifying agent for the carrier fluid. The VES may be selected from the group consisting of cationic, anionic, zwitterionic, amphoteric, nonionic, and combinations of these, such as those described in U.S. Pat. Nos. 6,435,277 and 6,703,352 the disclosures of which are incorporated by reference herein in their entireties.

In embodiments, the gravel packing fluids, treatment fluids, or compositions of the present disclosure may contain any desired amount of a mixture of cellulose fibers and cellulose nanoparticles to accomplish the intended down hole operation. In some embodiment, the mixture of cellulose fibers and cellulose nanoparticles may be present in an amount of from about 5 wt % to about 70 wt %, of from about 10 wt % to about 60 wt %, of from about 20 wt % to about 50 wt %, or of from about 30 wt % to about 40 wt % based on the total weight of the gravel packing fluid, treatment fluid, or composition. In some embodiments, the gravel packing fluids, treatment fluids, or compositions of the present disclosure may contain a mixture of cellulose fibers and cellulose nanoparticles being present in an amount of from about 0.001 wt % to about 10 wt %, such as, about 0.01 wt % to about 10 wt %, about 0.1 wt % to about 5 wt %, or of from about 0.5 wt % to about 5 wt % based on the total weight of the gravel packing fluid, treatment fluid, or composition.

In some embodiments, the gravel packing fluids, treatment fluids, or compositions of the present disclosure may comprise a mixture of cellulose fibers and cellulose nanoparticles (such as NCC) in any desired ratio, such as ratio in the range of from about 0.6:1 to about 1:0.6 (wt % cellulose fibers:wt % cellulose nanoparticles, such as NCC), such as in a ratio in a range of from about 0.8:1 to about 1:0.8 (wt % cellulose fibers:wt % cellulose nanoparticles, such as NCC), and or a ratio of about 1:1 (wt % cellulose fibers:wt % cellulose nanoparticles, such as NCC).

In some embodiments, the amount of the cellulose fibers (alone, not counting the cellulose nanoparticles) in the gravel packing fluids, treatment fluids, or compositions of the present disclosure may be an amount of from about 0.001 wt % to about 10 wt %, such as an amount of from about 0.01 wt % to about 10 wt %, or an amount of from about 0.1 wt % to about 5 wt %, or an amount of from about 0.5 wt % to about 2 wt % based on the total weight of the gravel packing fluid, treatment fluid, or composition; in such embodiments, the amount of the cellulose nanoparticles (alone, not counting the cellulose fibers) in the gravel packing fluids, treatment fluids, or compositions of the present disclosure may be an amount of from about 0.001 wt % to about 10 wt %, such as an amount of from about 0.01 wt % to about 10 wt %, or an amount of from about 0.1 wt % to about 5 wt %, or an amount of from about 0.5 wt % to about 2 wt % based on the total weight of the gravel packing fluid, treatment fluid, or composition.

The foregoing is further illustrated by reference to the following examples, which are presented for purposes of illustration and are not intended to limit the scope of the present disclosure.

EXAMPLES

Example 1: The following settling test experiments were carried out at 250° F. for 30 minutes to demonstrate how a combination of cellulose fibers and cellulose nanoparticles achieves improved suspension capability over formulations in which a combination of cellulose fibers and cellulose nanoparticles is absent.

A base fluid composition common for each of the fluids studied was prepared: The base fluid containing a viscoelastic surfactant (VES) 6% (by volume); $CaCl_2$/$CaBr_2$ (10.6 ppg); a brine solution (1.4039 g/mL density); and a proppant (Carbolite 20/40 Mesh at a concentration of 4 ppa). For the cellulose nanoparticles, NCC rod shaped materials having a length of about 92 nm and diameter of about 6 nm were used. For the cellulose fibers, cellulose fibers having a length in a range of from about 100 to 200 microns and diameter in a range of from about 10 to about 40 microns were used.

In the tests the base fluid was combined with the respective amounts of cellulose fibers and/or cellulose nanoparticles, as identified in the table below. Then the settling test experiments were carried out at 250° F. for 30 minutes and inspected visually. The results of the test are shown in the table below.

| Test Fluid | Cellulose Nanoparticles (wt %) | Cellulose Fibers (wt %) | % Sand that Settled |
|---|---|---|---|
| Experiment 1 | 0.25 wt % | 0 wt % | 100% |
| Experiment 2 | 0 wt % | 0.25 wt % | 100% |
| Experiment 3 | 0.25 wt % | 0.25 wt % | 0% |
| Experiment 4 | 0 wt % | 0.5 wt % | 100% |
| Experiment 5 | 0.5 wt % | 0 wt % | 0% |
| Experiment 8 | 0.375 wt % | 0.125 wt % | 0% |

Neither the cellulose nanoparticles nor the cellulose fibers (when used at an amount of 0.25 weight percent) were able to suspend the proppant. However, when the cellulose nanoparticles and the cellulose fibers were added together the mixture shows excellent suspension capability, which may result from a type of synergy between the two components (that is, the combination of the cellulose nanoparticles and the cellulose fibers creates a type of synergy).

Example 2: The following test demonstrates that cellulose nanoparticles (the same as those used above) help the cellulose fibers to suspend in solution.

A solution of 0.25 wt % of cellulose fibers (the same as those used above) in water was prepared and the cellulose fibers would fall to the bottom of the container. When this solution was passed through a 200 micron screen, a white filter cake was formed, as depicted in FIG. 1.

Figure 2:
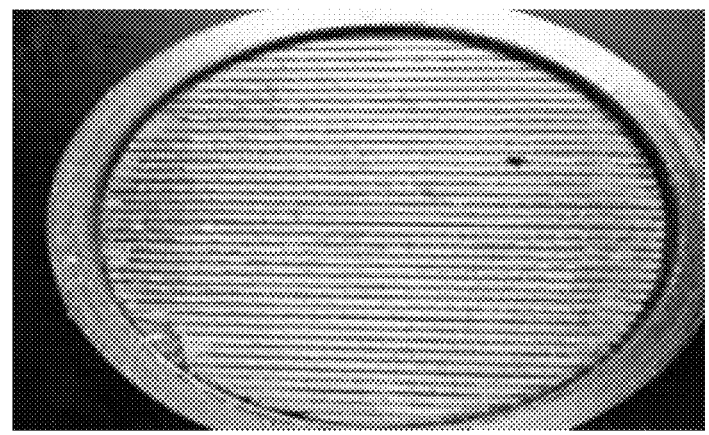
FIG. 2 shows no filter cake being formed as a result of a test.

However, when the cellulose fibers were mixed with cellulose nanoparticles (the same as those used above) at a ratio of 1/1, the fibers were suspended and no filter cake was formed, as depicted in FIG. 2.

Example 3: Regained permeability tests

The core regained permeability tests were performed on a Formation Response Tester equipment. The cellulose nanoparticles and cellulose fibers used were the same as those described above.

Figure 3:
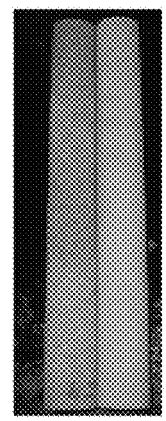
FIG. 3 shows sandstones cores as a result of a test.

The regained permeability tests were performed on Aloxite and sandstones cores, Bentheimer (1200-1600 mD) sandstones cores which are shown in FIG. 3.

The sandstone cores were analyzed by mercury injection capillary pressure tests. Results of the pores size distribution of the different samples are highlighted in the table below.

| Example Name | Mercury Inj. Porosity (fraction) | Median Pore Throat Size (μm) | Nanopores (1 nm < Diameter > 1 μm) (% PV) | Micropores (1 μm < Diameter > 62.5 μm) (% PV) | Mesopores (62.5 μm < Diameter > 4 mm) (%PV) |
|---|---|---|---|---|---|
| Bentheimer 1 | 0.23 | 35.5 | 3.36 | 96.3 | 0.319 |
| Bentheimer 2 | 0.20 | 34.5 | 2.94 | 97.1 | 0.00 |

| Example Name | Mercury/Air Entry Pressure (psi) | Air/Brine Entry Pressure (psi) | Swanson Permeability (mD) |
|---|---|---|---|
| Bentheimer 1 | 3.17 | 0.731 | 1691 |
| Bentheimer 2 | 3.81 | 0.879 | 1299 |

Both samples have a large portion of pores in the micropore regions ranging from 1 to 62.5 μm.

The regained permeability tests were carried out using 6 inch bentheimer cores of permeability close to 1.2D and formulation containing 6% VES and various concentrations (see the table below) of cellulose fibers were mixed with cellulose nanoparticles.

In order to arrive at the regained permeability data provided in the table below, the following methodology was used with the equipment illustrated above: 1) obtain 6" core and record the initial weight and dimensions; 2) saturate the core in 2% KCl for 20 minutes and remove it from the solution and record its saturated weight, and calculate "PV" (Pore volume of the core); 3) load the 6" core followed by 6" spacer (total length 12; 4) apply 2500 psi confining pressure and heat the cell to a predetermined temperature; 5) flow 2% KCl at 5 milliliters/minute (mL/min) and 20 mL/min in production to get an initial permeability value at those flow rates; 6) flow the treatment fluid at 2 ml/min injection direction until max pressure was reached (1800 psi); and 7) flow 2% KCl at 20 mL/min for about 100 PV in production direction and measure the regained permeability at 20 mL/min and 5 ml/min.

The results of the regained permeability tests for a formulation containing 6% VES and various concentrations of cellulose fibers and/or cellulose nanoparticles are shown in the table below.

| Test | Fluid | Percent Regained permeability |
|---|---|---|
| Experiment 6 | VES + 0.5% Cellulose Nanoparticles | 8 |
| Experiment 7 | VES + 0.5% (Cellulose Nanoparticles/Cellulose Fibers: 50/50) | 65 |
| Experiment 8 | VES + 0.5% (Cellulose Nanoparticles/Cellulose Fibers:75/25) | 30 |

The results of these experiments suggest that an increased percent regained permeability is achieved with a 1:1 weight ration of cellulose nanoparticles to cellulose fibers. By adjusting the concentration ratio, it is thus possible to control the regained permeability to the desired levels.

Although the preceding description has been described herein with reference to particular means, materials and embodiments, it is not intended to be limited to the particulars disclosed herein; rather, it extends to all functionally equivalent structures, methods and uses, such as are within the scope of the appended claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A fluid for treating a subterranean formation comprising:
    a solvent;
    a rheology modifier; and
    a composition comprising a mixture of cellulose fibers and cellulose nanoparticles, wherein the cellulose nanoparticles have a positive zeta potential in a range of about +100 mV to about +10 mV, and a length in a range of from about 50 nm to about 500 nm, and wherein the cellulose fibers have a length of from about 50 microns to about 500 microns.

2. The fluid for treating the subterranean formation of claim 1, wherein about 0.1 to about 2% by weight based on the total weight of the treatment fluid is the mixture of cellulose nanoparticles and cellulose fibers.

3. The fluid for treating the subterranean formation of claim 1, wherein the cellulose fibers are present in an amount of from about 25% to about 50% by weight based on the total weight of the mixture of cellulose nanoparticles and cellulose fibers.

4. The fluid for treating the subterranean formation of claim 1, wherein the cellulose nanoparticles are present in an amount of from about 50% to about 75% by weight based on the total weight of the mixture of cellulose nanoparticles and cellulose fibers.

5. The fluid for treating the subterranean formation of claim 1, wherein at least a portion of the cellulose nanoparticles have a negative zeta potential.

6. The fluid for treating the subterranean formation of claim 5, wherein the negative zeta potential is imparted by an anionic functional group that is present on the surface of the cellulose nanoparticles.

7. The fluid for treating the subterranean formation of claim 5, wherein the negative zeta potential is in a range of from about −100 mV to about −10 mV.

8. The fluid for treating the subterranean formation of claim 1, wherein each of the cellulose nanoparticles have an outer surface having a percent surface functionalization of from about 5 to about 90 percent.

9. The fluid for treating the subterranean formation of claim 8, wherein the outer surface of each of cellulose nanoparticles comprises one or more member selected from the group consisting of sulfates, phosphates, amines, and carboxylates.

10. The fluid for treating the subterranean formation of claim 1, wherein at least a portion of cellulose nanoparticles are a rod-like nanocrystalline cellulose particle (NCC particle) having a crystalline structure.

11. The fluid for treating the subterranean formation of claim 1, wherein the solvent is water or brine.

12. The fluid for treating the subterranean formation of claim 1, wherein the rheology modifier is a polymer.

13. The fluid for treating the subterranean formation of claim 1, wherein the rheology modifier is a viscoelastic surfactant.

14. The fluid for treating the subterranean formation of claim 1, wherein the fluid is selected from the group consisting of a fracturing fluid, well control fluid, well kill fluid, well cementing fluid, acid fracturing fluid, acid diverting fluid, a stimulation fluid, a sand control fluid, a completion fluid, a wellbore consolidation fluid, a remediation treatment fluid, a drilling fluid, a spacer fluid, a frac-packing fluid, water conformance fluid and gravel packing fluid.

* * * * *